Figure 1:
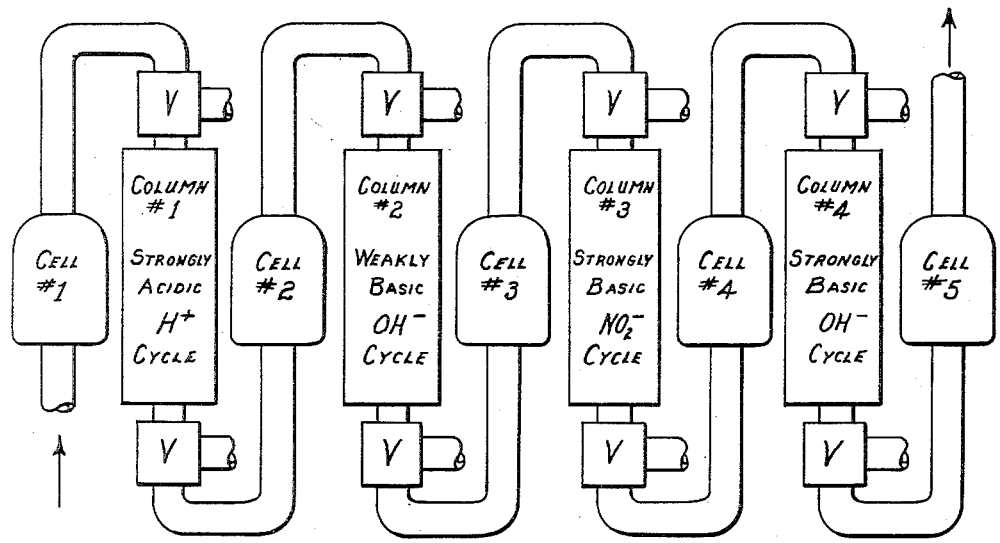

Aug. 23, 1960    L. C. THAYER ET AL    2,950,176
METHOD FOR LIQUID ANALYSIS
Filed Aug. 15, 1955

INVENTORS
LOUIS C. THAYER
MICHAEL CZUHA, JR.
MALBONE W. GREENE.
BY THEIR ATTORNEYS
HARRIS, KIECH, FOSTER, & HARRIS

United States Patent Office 2,950,176
Patented Aug. 23, 1960

2,950,176

METHOD FOR LIQUID ANALYSIS

Louis C. Thayer, Duarte, Michael Czuha, Jr., Temple City, and Malbone W. Greene, Pasadena, Calif., assignors, by mesne assignments, to Beckman Instruments, Inc., Fullerton, Calif., a corporation of California Filed Aug. 15, 1955, Ser. No. 528,280

8 Claims. (Cl. 23—230)

The present invention relates to new and improved methods and apparatus for the analysis of liquids.

The present invention may be briefly summarized as being concerned with procedures and equipment for analyzing liquids such as water for various ionic ingredients carried therein by first measuring the conductance of the liquid containing such ions; removing at least part of such ions and/or converting other of such ions to different species; and then again measuring the conductance of said liquid, so that by using electrical means as will be hereinafter described, the differential in the conductivity measurements obtained may be directly interpreted to indicate the initial ionic concentration within the liquid. With the invention a series of cells for measuring conductance is normally employed together with means disposed between each of these cells for selectively treating different classes of ionic ingredients.

Direct and continuous measurement of the quantity of various classes of ions present in a liquid presents an extremely difficult problem. However, it has been found that by (1) selective removal and/or conversion of the various classes of ions in a predetermined order, and (2) measurement of the conductance of the liquid before and after each removal or conversion step, the initial ionic makeup of the liquid may be determined. The conversion of all anions to strongly acidic anions at predetermined intervals permits the highest sensitivity in conductance measurements and direct correlation of the indicated variable to the concentration of dissolved ingredients in the liquid. The present invention involves a chemical separation of the ions contained in a liquid, based on the ion exchange properties as cations and anions, and on selective exchange of weak and strong ions on different exchange materials.

A brief summary of the above category does not actually indicate the true scope of an invention, and, by necessity in summarizing an invention, terms must frequently be used which are apt to mislead those unfamiliar with the full scope of the invention as to the precise limitations of the inventive concept. Perhaps the present invention is best explained with reference to one of the materials normally analyzed in accordance with the teachings of it. This material is boiler feed-water.

It is well known in the art that boiler feed-water contains a large number of ingredients which may either tend to corrode various parts with which the water comes in contact, or to form deposits thereon tending to change heat conductance coefficients on such parts. As an example of the materials found within conventional boiler feed-water, reference is made to the fact that various basic inhibitor materials such as cyclohexylamine, morpholine, ammonia, and trisodium phosphate are frequently added to water in order to raise the pH of it within the range of from about 8 to about 10 in order to reduce the corrosive tendency of the water. Water usually contains various cationic impurities such as sodium, calcium and magnesium ions, which may be present along with such anions as the carbonate ion, the silicate ion, the chloride ion, the sulfate ion, and the phosphate ion. The anions may, in general, be divided for practical purposes into two categories—strongly or weakly acidic. The reactions of anions falling within either of these two classes are broadly very similar, and, hence, for practical work in controlling boiler feed-water, the anions within either of these groups may be considered together.

A sample of boiler feed-water may be considered as containing the ions listed under Cell 1 of Table I, which will be used for explanatory purposes in further describing the invention.

*Table I*

| Cell 1, $g_1$ | Cell 2, $g_2$ | Cell 3, $g_3$ | Cell 4, $g_4$ | Cell 5, $g_5$ |
|---|---|---|---|---|
| $R-NH_3^+OH^-\rightarrow$ | $H_2O$ | | | |
| $Fe^{+++}+3Cl^-\rightarrow$ | $3H^++3Cl^-$ | $3H_2O$ | | |
| $Cu^{++}+2Cl^-\rightarrow$ | $2H^++2Cl^-\rightarrow$ | $2H_2O$ | | |
| $Mg^{++}+SO_4^-\rightarrow$ | $2H^++SO_4^-\rightarrow$ | $2H_2O$ | | |
| $Na^++H_2PO_4^-\rightarrow$ | $H^++H_2PO_4^-$ | $H_2O$ | | |
| $Ca^{++}+2HCO_3^-\rightarrow$ | $2H_2CO_3\rightarrow$ | $2H_2CO_3\rightarrow$ | $2H^++2NO_2^-\rightarrow$ | $H_2O$ |
| $Na^++HSiO_3^-\rightarrow$ | $H_2SiO_3\rightarrow$ | $H_2SiO_3\rightarrow$ | $H^++NO_2^-\rightarrow$ | $H_2O$ |

Therein, various anions and cations are shown together as if these specific ions were associated together in chemical compounds. It will be realized by those skilled in the art that this representation in the table is for convenience only inasmuch as a fundamental definition of ions within a liquid such as water indicates that such ions are not, strictly speaking, chemically combined, but are in the nature of separate entities within the disbursing medium. The cyclohexylamine, $R-NH_3OH$, has been added to the water as a corrosion inhibitor.

Figure 2:
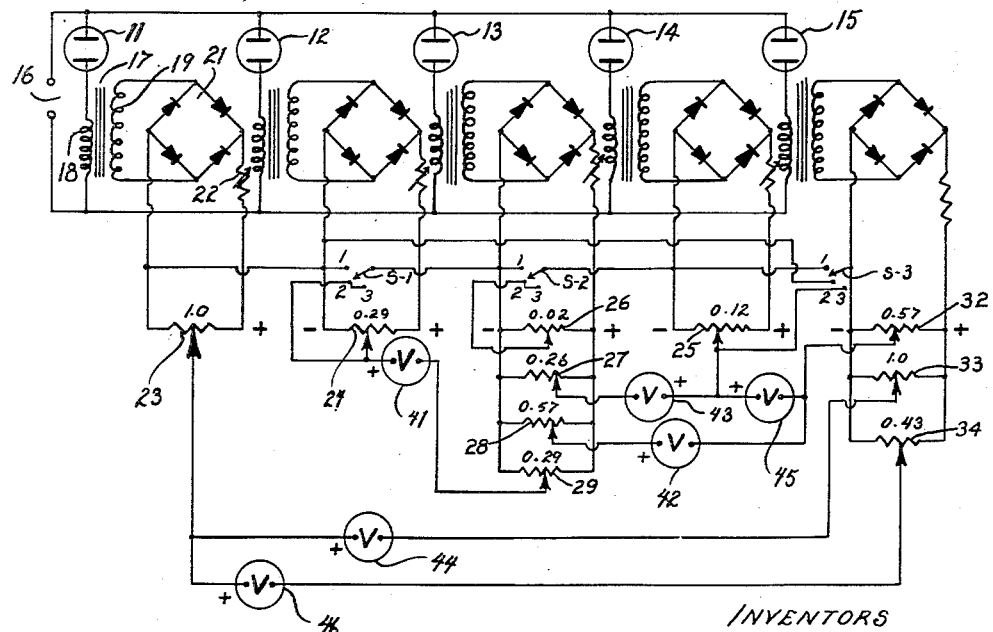

In the accompanying drawings, which are set forth in diagrammatic form for convenience of explanation:

Fig. 1 shows the flow system employed with the invention in the treatment and measurement of liquids in accordance with this disclosure; and Fig. 2 shows an electrical circuit which is preferably employed with the invention in conjunction with the various measuring cells indicated in Fig. 1.

In carrying out the invention in the analysis of boiler feed-water, such water is passed through a first conductance cell labeled Cell 1, in Fig. 1, where the conductance of this water is measured. The water is then passed through a first ion exchange column labeled column 1 in Fig. 1. This initial column is used in order to neutralize or remove organic amines from the water, and to replace cations of dissolved salts with hydrogen ions. The result of this initial treatment of boiler feed-water from a chemical standpoint is indicated under Cell 2 of Table I. The removal of organic amines and metal cations is substantially complete so as to effectually constitute a complete stoichiometric conversion of all compounds present to either water or inorganic acids, the effluent from column 1 being a mixture of strong and weak acids and water. The weak acids, such as carbonic and silicic, are indicated as un-ionized under Cells 2 and 3 of Table I. However, a small portion of these weak acids are ionized and the presence of these weakly acidic anions must be given consideration in order to perform accurate analyses. The conversion occurring in column 1 greatly affects the conductivity of the feed-water, increasing this conductivity by approximately 300% in many instances.

The desired conversion in column 1 may be obtained by using therein a strongly acidic ion exchange material such as sulfonated polystyrene resin on the hydrogen cycle. Some particularly suitable resins of this type are those currently known by the trade-names Amberlite 120, Dowex 50 and Permutit Q.

After the feed-water has been passed through column 1, it is passed through a second conductivity cell, Cell 2, indicated in Fig. 1, where the conductivity of it is again measured. The differential in conductivity between Cells 1 and 2 may be used as will be subsequently indicated.

The principal scale forming constituents in boiler feedwater are the weak acid anions, such as carbonates and silicates, which as seen under Cell 2 of Table I, have been converted to un-ionized weak acids as a result of passing through column 1. In the analysis of such water, it is necessary to make at least one measurement which is related to the concentration of weak acid anions only. Following the process of the invention, the water is next passed through a second ion exchange column indicated as column 2 in Fig. 1. Therein strongly acidic anions, such as the sulfate ion, the chloride ion and the phosphate ion, are removed, leaving the weak acids remaining in the effluent from the first ion exchange column 1 unaltered chemically. The chemical change produced as a result of the second ion exchange column treatment is indicated under Cell 3 of Table I.

The conversion of the strongly acidic anions to hydroxyl anions, which in turn combine with the hydrogen cations present in the water, to form water, may be obtained by using a weakly basic ion exchange material, such as a polyamine phenol-formaldehyde resin, on the hydroxyl cycle. Some suitable resins of this category are those currently known by the trade-names Amberlite IR-4B, Dowex 3 and Permutit W.

Following this step, the conductivity of the water leaving column 2 is measured, using measuring Cell 3 indicated in Fig. 1. The measurement obtained with this step may be used in conjunction with the measurements obtained in Cells 1 and 2 so as to derive a further indication as to the composition of the initial boiler feed-water, as will be more fully indicated subsequently. Since the weak acids contained in the effluent from column 2 are only slightly ionized, it is difficult to obtain accurate conductance measurements thereon. To surmount this problem, in accordance with the process of the invention, the weakly acidic anions are converted to strongly acidic anions which will be present in a highly ionized state. As the weakly acidic anions are converted, more of the weak acids become ionized, the conversion continuing until all of the weak acids are converted to strongly acidic ions.

The boiler feed-water is next passed through a third ion exchange column, column 3 of Fig. 1, where the very weakly acidic ions are replaced by a stronger acidic ion, such as a nitrite ion, and hence the conductivity of the solution is increased. This treatment in the third ion exchange column has the chemical effect indicated under Cells 3 and 4 of Table I above. The change in conductivity is sufficient so that it may be easily and conveniently measured using conventional conductivity cells with a minimum of difficulty, obtaining significant conductivity readings.

The desired conversion in column 3 may be obtained by using therein a strongly basic ion exchange material, such as a quaternary amine polystyrene resin operating on a strongly acidic anion cycle, such as a nitrite cycle. Some particularly suitable resins for use with this step of the invention are those currently known by the tradenames Amberlite IRA-400, Dowex 1 and Permutit S.

The water passing from column 3 is preferably passsed through another conductivity Cell 4, indicated in the drawings. The value of the conductivity obtained in Cell 4 may be further used in determining the content of the initial feed-water, as will be subsequently indicated.

Water from the conductivity Cell 4 is next passed through another exchange column, identified as column 4 in the drawings. Here the strongly acidic anion placed into the water as a result of the treatment in column 3 is removed, resulting in the complete deionization of water passed through the complete apparatus of the instant invention. The reaction taking place in the ion exchange column 4 is indicated under Cells 4 and 5 of Table I.

The desired conversion in column 4 may be obtained by using therein a strongly basic anion exchange material, such as the quaternary amine polystyrene resin, indicated in the preceding in conjunction with column 3, but operating on the hydroxyl cycle. The material indicated as suitable for use in column 3 is also suitable for use in column 4.

The effluent from column 4 is passed through conductivity Cell 5, as indicated in Fig. 1. Theoretically, the conductivity of the water passing through this cell should be zero. Unfortunately, the ion exchange operations carried out in accordance with this invention are not always effective to the maximum possible extent, and, as a result, some ions such as sodium may still be present within the water passing through Cell 5, causing this water to have some small amount of conductivity. It is necessary with the invention to take this unwanted conductivity into consideration if exceedingly accurate results are to be obtained using the procedure herein described.

It is indicated in the preceding discussion that, from the five different conductivity measurements described, the proportion of various classes of ionic ingredients in the liquid may be calculated. It is considered unnecessary within the scope of this specification to set forth the precise derivation of the calculations made inasmuch as such a derivation is within the skill of the average analytical chemist. However, the various values desired may be obtained utilizing the following formulas given in Table II, where the conductivities measured by the various cells are designated by the letter "g" followed by the number of the measuring cell, the results being given in parts per million:

Table II

Concentration:
 Strong acid salt_____ $0.29(g_2-g_3)$
 Weak acid salt_____ $0.57(g_3-g_5)$
 Very weak acid salt___ $0.12(g_4-2.2g_3)$
 Total dissolved solids_ $0.29(g_2-g_3)+0.57(g_3-g_5)+0.12(g_4-2.2g_3)$
 Inhibitor_____ $(g_1-g_5)$ — [Total dissolved solids]

The term "total dissolved solids" given in Table II is to be considered as synonymous with the total quantity of ions present within the water being treated in accordance with the invention.

The numerical value of the factors by which the measured conductances are multiplied is based upon a prior chemical analysis of the liquid being analysed. The continuous analysis produced by the practice of the invention will give an accurate analysis of the fluid for variations from the prior chemical analysis as great as ±20%. However if a new source for the boiler feed water of the example were selected it would be necessary to make an analysis of this new water and adjust the multiplying factors accordingly.

Since the conductivities obtained in accordance with this invention are additive, the results indicated in Table II can be obtained electrically by means which give a direct indication of each of the above quantities on a continuous basis, and, further, various conventional recording equipments may be employed so as to keep an accurate log of the variation in boiler feed-water.

The present invention is not to be considered as being limited to the precise operational steps or sequence of operations indicated in the preceding discussion. As an example of this, it is possible to use the measurements carried out in Cells 1 and 2, indicated in the accompanying drawings, without conducting the remainder of the operations described in the foregoing in obtaining an indication as to certain ingredients within boiler feed-water or other liquids. It is, therefore, to be considered as an object of this invention to provide a method for the analysis of a liquid which consists of the steps of measuring the conductivity of such liquids before and after a treatment operation designed to convert a certain class of ionic compounds in such liquid to a different class. The breadth of this object is not to be minimized, as the single conversion step specified in it may be a conversion step using a strongly acidic ion exchange material, or other classes of related materials. Further, the conversion step may, under some circumstances, be replaced by other treatments, such as, for example, treatments with a buffering material which is designed to lower or increase the conductivity of a liquid. It should be clear that where reference is made to the removal of ions from a liquid that a replacement is inferred, the reaction taking place with an ion exchange material being the mutual transfer of ions between the liquid and the exchange material, resulting in a substitution or conversion in the ion content of the liquid.

The invention may be utilized in the analysis of fluids for constituents which are essentially non-ionic in nature. Such a compound would be very slightly dissolved producing a few ions. These ions would be removed from solution and ions of a different species substituted therefor on contact with a suitable ion exchange material. As these ions are removed additional small amounts of the compound go into solution in order to replace the removed ions, this process continuing until the non-ionic constituent is totally dissolved.

The various ionic ingredients removed by the ion exchange materials indicated accumulate within the exchange columns until such time as it is necessary to regenerate these materials by various means well known to the art, such as, for example, treatment with acids or bases. During such regeneration, the various ionic ingredients may be collected, separated and separately analyzed, using conventional means, so as to determine the precise chemical composition of the ingredients within the liquid. It is an object of this disclosure to provide a process of the class described in which various ionic ingredients within a liquid are collected so that they may be removed from the analysis system after an extended period, and separately analyzed.

An ion exchange column may be removed from the apparatus during the regeneration process or the method indicated in Fig. 1 may be utilized. Therein each of the columns has a valve V at each end thereof. During the liquid analysis period, each of the valves is set to provide a continuous flow of liquid from cell to cell. In the regeneration process, the valve at each end of the column is turned to block the above mentioned flow and a suitable regeneration liquid is passed through the column from an external source not shown.

While boiler feed-water has been indicated in the preceding discussion, it is to be understood that the present invention is not limited in scope to the analysis of this specific liquid. Thus, it can be employed with other fluids, such as, for example, in a determination of the proportions of sodium and potassium salts present in a liquid by the exchange of the sodium ions for potassium ions followed by an exchange of the potassium ions for other species.

An electrical circuit for continuously performing the computations indicated in Table II is shown in Fig. 2 wherein the conductivity cells 1 through 5 of Fig. 1 are designated by numerals 11 through 15, respectively. A load is connected in series with each of the conductivity cells and the series combination of cell and load is connected to an alternating current power source 16. Identical load circuits are connected with each cell and the circuitry associated with cell 11 will be described as typical. A transformer 17 has a primary winding 18 connected in series with the cell 11 across the power source 16. A secondary winding 19 of the transformer 17 is connected to a full wave rectifier 21 and the rectified output of the rectifier 21 is connected across a variable resistor 22 and a potentiometer 23. The variable resistor 22 and the corresponding resistor associated with the other cells are adjusted to produce equal voltages across each of the potentiometers when identical liquids are in each of the cells, thereby compensating for variations in cells and circuit components.

If the conductance coupled in series with the cell 11 by the primary winding 18 is very large in comparison to the conductance of the cell and liquid contained therein, the voltage developed across the primary winding will be very nearly directly proportional to the conductance of the cell. Therefore, the difference between the voltages developed across two of the loads will be substantially directly proportional to the difference between the conductances measured by the associated cells and hence directly proportional to the change in ionic content produced by the intervening ion exchange column or columns.

The load circuitry of cells 12 and 14 are each provided with a single potentiometer 24, 25, respectively, the load circuitry of cell 13 is provided with four potentiometers 26, 27, 28, 29 and the load circuit of cell 15 is provided with three potentiometers 32, 33, 34. The parallel connected potentiometers are used with cells 13 and 15 because the outputs of the respective cells are present in more than one computation; however, the same result could be obtained utilizing a single resistor with each cell, the resistor having a plurality of taps thereon. It is to be noted that a resistor could be substituted for the primary winding 18 and that the rectifier 21 could be omitted without affecting the method of computation. The circuit illustrated is preferable in that the transformer coupling permits the load potentiometers to be electrically isolated from the cells thereby facilitating switching and interconnection of the various potentiometers and the use of direct current voltages eliminates difficulties due to phasing differences.

The various computations which are performed by the circuit of Fig. 2 to give the analysis of the boiler feed-water are set out in Table III and correspond to the formulas given in Table II:

*Table III*

| Meter | Switch Position | Quantity Determined | Computation Performed |
|---|---|---|---|
| 41 | 1 | Strong acid anions | $0.29g_2 - 0.29g_3$ |
| 42 | 1 | Weak acid anions | $0.57g_3 - 0.57g_5$ |
| 43 | 1 | Very weak acid anions | $0.12g_4 - 0.26g_3$ |
| 44 | 1 | Net raw conductivity | $g_1 - g_5$ |
| 45 | 2 | Total dissolved solids | $0.29g_2 + 0.02g_3 + 0.12g_4 - 0.57g_5$ |
| 46 | 3 | Total inhibitor | $g_1 - 0.29g_2 - 0.02g_3 - 0.12g_4 - 0.43g_5$ |

The computations are performed by adding and/or subtracting the indicated portions of the outputs of the various conductivity cells. For example, the quantity of strong acid anions in the water is determined by subtracting 0.29 of the output of cell 13 from 0.29 of the output of cell 12, the difference voltage being determined by a meter 41. The meter may be provided with a suitable scale so that it can be read directly in parts per million. The other quantities of Table III are determined by measuring the voltages appearing at meters 42, 43, 44, 45 and 46. S-1, S-2 and S-3 indicate the three elements of a three-position triple pole switch. The switch is thrown to position 1, position 2 or position 3 as indicated in Table III for the desired computation.

The meters 41 through 46 should be of the potentiometer type drawing zero current when balanced and should be provided with normally open switches so that they are connected in the circuit only when a reading is being made. This is done in order to prevent the meters from adding undesired loads on the computing circuitry.

Since changes could be made in the above method and apparatus and many apparently widely different embodiments of this invention could be made without departure from the scope thereof, it is intended that all matter contained in the above description and shown in the accompanying drawings shall be interpreted as illustrative and not in a limiting sense.

We claim as our invention:

1. A method of continuously analyzing water containing anionic and cationic compounds disposed therein for said ionic compounds, which comprises: measuring the conductance of said water; passing said water through a cation exchange material so as to replace the cations other than hydrogen within said water with hydrogen ions; measuring the conductance of said liquid after it has been passed through said cation exchange material; comparing the two measured conductances to determine the difference therebetween, the change in conductance being a function of the quantity of cations replaced by said cation exchange material; passing said water through an anion exchange material so as to replace the anions other than hydroxyl within said water with hydroxyl ions, causing the formation of water; measuring the conductance of said water after it has been passed through said anion exchange material, with said water being passed through said exchange materials in a continuous stream and with said conductance measurements being made at the same time; and continuously comparing the three measured conductances to determine the differences therebetween, the changes in conductance being functions of the quantity of anions within said water.

2. A method of continuously analyzing water containing anionic and cationic compounds disposed therein for said ionic compounds, which comprises: measuring the conductance of said water; contemporaneously producing a first electrical signal representative of the conductance; passing said water through a first ion exchange material so as to replace the cations other than hydrogen within said water with hydrogen ions; measuring the conductance of said water after it has been passed through said first ion exchange material; contemporaneously producing a second electrical signal representative of the conductance; passing said water through a second ion exchange material so as to replace the anions other than hydroxyl within said water with hydroxyl ions, causing the formation of water; measuring the conductance of said water after it has been passed through said second ion exchange material, with said conductance measurements being made at the same time; contemporaneously producing a third electrical signal representative of the conductance; and combining predetermined portions of said electrical signals producing first and second resultant signals, said first resultant signal being proportional to the quantity of cations other than hydrogen within said water and said second resultant signal being proportional to the quantity of anions other than hydroxyl within said water.

3. A method of continuously analyzing water for impurities, comprising the steps of: measuring the conductance of said water; then passing the water through at least four ion exchange materials in a continuous stream, one of said materials being strongly acidic and operating on a hydrogen cycle, another of said materials being weakly basic and operating on a hydroxyl cycle, a third of said materials being strongly basic and operating on a strong acid anion cycle, and a fourth of said materials being strongly basic and operating on a hydroxyl cycle; measuring the conductance of said water after passing through each of said ion exchange materials, with said conductance measurements being made at the same time; and comparing the measured conductances to determine the differences therebetween, the changes in conductance being functions of the type and quantity of impurities within said water.

4. A method of continuously analyzing water for impurities, comprising the steps of: measuring the conductance of said water; contemporaneously producing a first electrical signal representative of the conductance; then passing the water through at least four ion exchange materials in a continuous stream, one of said materials being strongly acidic and operating on a hydrogen cycle, another of said materials being weakly basic and operating on a hydroxyl cycle, a third of said materials being strongly basic and operating on a strongly acidic anion cycle, and a fourth of said materials being strongly basic and operating on a hydroxyl cycle; measuring the conductance of said water after passing through each of said ion exchange materials, with said conductance measurements being made at the same time contemporaneously producing additional electrical signals representative of each of the conductances measured; and adding predetermined portions of said electrical signals to produce a plurality of resultant signals, each of said resultant signals being proportional to a particular group of impurities present in the water.

5. A method for continuously analyzing a liquid to determine the concentration of weak and strong acids therein, which comprises: measuring the conductance of the liquid; passing the liquid through a weakly basic ion exchange material in the hydroxyl form so as to convert the strongly acidic anions in the liquid to hydroxyl ions, causing the formation of water; then measuring the conductance of the liquid; then passing the liquid through a strongly basic ion exchange material in a strongly acidic anion form so as to convert the weakly acidic anions in the liquid to strongly acidic anions; then measuring the conductance of the liquid, with said liquid being passed through said exchange materials in a continuous stream and with said conductance measurements being made at the same time; and continuously comparing the measured conductances to determine the differences therebetween, the changes in conductances being functions of the concentration of weak and strong acids initially within the liquid.

6. A method for continuously analyzing a liquid to determine the concentration of weak and strong acids therein, which comprises: measuring the conductance of the liquid; passing the liquid through a weakly basic ion exchange material in the hydroxyl form so as to convert the strongly acidic anions in the liquid to hydroxyl ions, causing the formation of water; then measuring the conductance of the liquid; then passing the liquid through a strongly basic ion exchange material in a strongly acidic anion form so as to convert the weakly acidic anions in the liquid to strongly acidic anions; then measuring the conductance of the liquid; then passing the liquid through a strongly basic ion exchange material in the hydroxyl form so as to convert the strongly acidic anions in the liquid to hydroxyl ions, causing the formation of water; then measuring the conductance of the liquid, with said liquid being passed through said exchange materials in a continuous stream and with said conductance measurements being made at the same time; and comparing the measured conductances to determine the differences therebetween, the changes in conductances being functions of the concentration of weak and strong acids initially within the liquid.

7. A method of continuously analyzing water for impurities, comprising the steps of: measuring the conductance of said water; then passing the water successively through four ion exchange materials in a continuous stream, the first of said materials being strongly acidic and operating on a hydrogen cycle, the second of said materials being weakly basic and operating on a hydroxyl cycle, the third of said materials being strongly basic and operating on a strong acid anion cycle, and the fourth of said materials being strongly basic and operating on a hydroxyl cycle; measuring the conductance of said water after passing through each of said ion exchange materials, with said conductance measurements being made at the same time; and comparing the measured conductances to determine the differences therebetween, the changes in conductance being functions of the type and quantity of impurities within said water.

8. A method of continuously analyzing water containing anionic and cationic compounds disposed therein for said ionic compounds, which comprises: measuring the conductance of said water; passing said water through a cationic exchange material so as to replace the cations other than hydrogen within said water with hydrogen ions; passing said water through an anion exchange material so as to replace the anions other than hydroxyl within said water with hydroxyl ions; measuring the conductance of said water after it has been passed through said cation exchange material; measuring the conductance of said water after it has been passed through said anion exchange material, with said water being passed through said exchange materials in a continuous stream and with said conductance measurements being made at the same time; and continuously comparing the three measured conductances to determine the differences therebetween, the changes in conductances being functions of the quantity of anions and cations initially within said water.

References Cited in the file of this patent
UNITED STATES PATENTS

| | | |
|---|---|---|
| 1,065,246 | Held | June 17, 1913 |
| 1,175,640 | Kieffer | Mar. 14, 1916 |
| 1,388,613 | Simsohn | Aug. 23, 1921 |
| 1,912,188 | Gann | May 30, 1933 |
| 2,224,382 | Douty | Dec. 10, 1940 |
| 2,429,943 | Prager | Oct. 28, 1947 |
| 2,565,501 | Ingram | Aug. 29, 1951 |
| 2,617,766 | Emmett et al. | Nov. 11, 1952 |
| 2,676,923 | Young | Apr. 27, 1954 |
| 2,711,995 | Sard | June 28, 1955 |

FOREIGN PATENTS

| | | |
|---|---|---|
| 721,365 | Germany | June 5, 1942 |

OTHER REFERENCES

Degremont: Water Treatment Handbook, 1954, pp. 37, 41, 42.

Samuelson: "Ion Exchangers in Anal. Chem.," p. 111, 1953.

Calise et al.: Industrial and Engineering Chemistry, vol. 41, No. 11, November 1949, pp. 2554–63.

Osmun et al: Industrial and Engineering Chemistry, vol. 43, May 1951, pp. 1076–78.

UNITED STATES PATENT OFFICE
CERTIFICATE OF CORRECTION

Patent No. 2,950,176            August 23, 1960

Louis C. Thayer et al.

It is hereby certified that error appears in the printed specification of the above numbered patent requiring correction and that the said Letters Patent should read as corrected below.

Column 1, line 59, for "the" read -- their --; column 2, Table I, first column, fourth line thereof, for "$SO_4^-$" read -- $SO_4^=$ --; same Table I, first column, fifth line thereof, for "$Na^+ + H_2PO_4^-$" read -- $Na^+ + H_2PO_4^- \longrightarrow$ --; same Table I, second column, line 2 thereof, for "$3H^+ + 3Cl^-$" read -- $3H^+ + 3Cl^- \longrightarrow$ --; same Table I, second column, fifth line thereof, for "$H^+ + H_2PO_4^-$" read -- $H^+ + H_2PO_4^- \longrightarrow$ --; column 5, line 15, for "liquids" read -- liquid --; column 8, line 24, after "time" insert a semicolon.

Signed and sealed this 18th day of April 1961.

(SEAL)
Attest:

ERNEST W. SWIDER            DAVID L. LADD
Attesting Officer            Commissioner of Patents